United States Patent [19]

Thompson et al.

[11] 4,294,549
[45] Oct. 13, 1981

[54] MIXING APPARATUS

[75] Inventors: Raymond V. Thompson, Stocksfield; Alan Todd, Chester-le-Street; Albert B. Constantine, Great Lumley, all of England

[73] Assignee: Dynatrol Consultants (U.K.) Limited, Newcastle-upon-Tyne, England

[21] Appl. No.: 48,383

[22] Filed: Jun. 14, 1979

Related U.S. Application Data

[62] Division of Ser. No. 749,369, Dec. 10, 1976, Pat. No. 4,172,668.

[30] Foreign Application Priority Data

Dec. 12, 1975 [GB] United Kingdom ............... 51027/75
Aug. 26, 1976 [GB] United Kingdom ............... 35600/76

[51] Int. Cl.³ .......................... B01F 5/06; B01F 5/12
[52] U.S. Cl. .................................. 366/164; 366/176; 366/263
[58] Field of Search ............... 366/176, 163, 164, 263, 366/264, 272; 415/213 R, 83, 90

[56] References Cited

U.S. PATENT DOCUMENTS

| 1,098,721 | 6/1914 | Hallsworth . |
| 1,145,600 | 7/1915 | Wright . |
| 1,160,404 | 11/1915 | Beinsen . |
| 1,650,088 | 11/1927 | Molin . |
| 1,774,910 | 9/1930 | Whatmough . |
| 2,245,632 | 6/1941 | Winkler . |
| 2,598,469 | 5/1952 | Korshenewsky . |
| 2,889,118 | 6/1959 | Schneider . |
| 3,534,753 | 10/1970 | Olliwier . |
| 3,941,517 | 3/1976 | Miyahara ........................... 366/265 |
| 4,002,324 | 1/1977 | Huet ................................... 366/163 |

FOREIGN PATENT DOCUMENTS

| 393503 | 4/1921 | Fed. Rep. of Germany . |
| 901011 | 1/1951 | Fed. Rep. of Germany . |
| 808114 | 7/1951 | Fed. Rep. of Germany . |
| 1551936 | 3/1970 | Fed. Rep. of Germany . |
| 2033168 | 7/1970 | Fed. Rep. of Germany . |
| 1026389 | 2/1953 | France . |
| 411458 | 4/1966 | France . |
| 755823 | 8/1956 | United Kingdom . |
| 755912 | 8/1956 | United Kingdom . |
| 1187399 | 4/1970 | United Kingdom . |
| 1296129 | 11/1972 | United Kingdom . |
| 1381156 | 1/1975 | United Kingdom . |

OTHER PUBLICATIONS

"Mechanics of Fluid", Masey, Section 14.4, p. 463.

*Primary Examiner*—Robert W. Jenkins
*Attorney, Agent, or Firm*—Oblon, Fisher, Spivak, McClelland & Maier

[57] ABSTRACT

A mechanized emulsifier is disclosed for mixing water and hydrocarbon fuels for boilers and internal combustion engines. A rotor is driven in an annular chamber and liquids drawn in at the axis of the rotor are thrown out through narrow radial passages therein to impinge on the outer wall of the annular chamber. This wall is circular for most of its circumference but broadens out into a spiral shaped outlet chamber. A fluid logic circuit for automatic control of the emulsifier is also set forth.

3 Claims, 8 Drawing Figures

MIXING APPARATUS

This is a division of application Ser. No. 749,369, filed Dec. 10, 1976, now U.S. Pat. No. 4,172,668.

BACKGROUND OF THE INVENTION

1. Field of the Invention

The present invention is concerned with apparatus for mixing two immiscible liquids and especially for introducing water into fuel supplies, especially hydrophobic fuels, in such a manner as to improve the combustion characteristics of the fuel mixture.

The invention is also concerned with control circuitry for use with the apparatus, which for ease of reference will be referred to as an emulsifier. The emulsifier has been developed with the particular problems of industrial oil-fired boilers in mind, but is also applicable to the supply of fuel to diesel engines, to gas turbines and to fuel injection, or carburettor petrol engines.

2. Description of the Prior Art

Many proposals have been made for ways of introducing water into fuels, since this is known to reduce the nitrous oxide content of the exhaust gases. Among these are the introduction of chemical emulsifiers to mixtures of fuel and water. These, however have been found to interfere with the combustion process. Mechanical methods previously proposed have also not resulted in significant improvements.

SUMMARY OF THE INVENTION

It is an object of the present invention to produce a simple and cheap mechanical emulsifier which will result in improved fuel utilization.

According to the present invention an apparatus for mixing fluids includes a housing affording a substantially annular mixing chamber, a preferably annular rotor mounted for rotation in the mixing chamber, the rotor having one or more inlet orifices disposed at or adjacent its axis of rotation, an inlet chamber communicating with the inlet orifices in the rotor and disposed at or adjacent the axis of rotation of the rotor, the inlet chamber being provided with an inlet member for the fluids to be mixed, outwardly extending passages being located in the rotor, and leading from the inlet orifices to the periphery of the rotor and emerging therethrough, the mixing chamber having a circular outer wall, which is preferably smooth and continuously circular, extending around a major proportion of its circumference with a small clearance between the circular wall and the periphery of the rotor, the circular outer wall extending outwardly into a spiral shape so as to define an outlet region, preferably generally crescent shaped, between the outwardly extending portion of the wall of the mixing chamber and the periphery of the rotor, the outlet region communicating with an outlet passage, preferably disposed generally tangentially to the mixing chamber, and a drive member arranged so as to enable the rotor to be rotated in the mixing chamber.

The radial passages preferably have at least one constriction intermediate their ends. In one preferred form of the invention, four (4) to twenty (20) radial passages are provided. Each radial passage preferably has a convergent entry portion leading to the constriction and a divergent outlet portion.

In another form of the invention each radial passage diverges from an inlet to a constriction region in which a multiplicity of constrictions are located, e.g. each issuing out as diverging passages through an annular wall. There may be three (3) to ten (10) such passages each having two (2) to seven (7) constrictions. The annular wall is preferably disposed 50% e.g. 75% to 90% of the length of the radial passage from its inlet end.

In yet another form of the invention the rotor is provided with a multiplicity of outwardly disposed labyrinthine pores or ducts extending outwardly from an annular inlet wall to an annular outlet wall. These pores or ducts may be provided by regions of porous or microporous material extending out through the rotor or the rotor may be made wholly of such material.

In one form of this aspect of the invention, the rotor is divided into a multiplicity of, e.g. four (4) to twenty (20), wedge shaped outwardly diverging ducts each of which have porous or microporous material e.g. sintered metal material located across at least part of their width and preferably filling the whole of the duct.

A further object of the invention is to preserve the required ratio of admixture as the rate of delivery of the mixture is controlled by variation in the rate of fuel supply to an emulsifier, i.e. to maintain a preset fuel/water ratio even when the load on the device being supplied by the emulsifier varies.

According to another aspect of the invention a control circuit for a device for mixing two fluid media comprises a first fluid supply line adapted to be connected to the mixing device, a second fluid supply line adapted to be connected to the mixing device, a first member for presetting the flow of the second fluid to be a desired function of the flow of the first fluid, and second member responsive to pressure or flow variations in the first fluid supply line for adjusting the flow through the second line so that it automatically varies on a change occurring in the first line so that it returns to the same preset function of the flow in the first fluid supply line.

Preferably a third member is provided to sense any pressure or flow variations in the first fluid supply line and supply a control signal to the second member.

Preferably the second and third member are fluid logic devices and the flow through the third member is preferably arranged to be no more than a small fraction of that through the second member, e.g. 1/10 to 1/500 e.g. 1/100 or 1/50 to 1/150.

The second member is preferably a vortex diode and the first member is preferably a differential beam deflection amplifier.

In a preferred form of the invention the first supply line is connected to one control port of the beam deflection amplifier and to the mixing device and the second supply line is connected to the other control port via a restrictor and directly to the input of the amplifier and the output port of the amplifier is connected to the control port of the vortex diode and the second supply line is also connected to the input port of the vortex diode via a restrictor, the output port of the vortex diode being connected to the mixing device, the output flow of the amplifier being arranged to be appropriate as a control signal for the vortex diode.

Thus in a preferred form of the invention, the fluid mixing apparatus comprises a matched pair of variable flow fluid impedance devices, the primary inlet port of the first of which is connected to a water supply line and the secondary inlet port to a fuel line, at a point between a fuel supply valve and an emulsifier, the primary inlet port of the second variable flow fluid impedance device being connected to the water supply line and its secondary inlet port to the outlet port of the first variable flow fluid impedance device while its outlet port is connected to the emulsifier for supplying water thereto.

A variable restrictor, e.g. a set screw, is preferably provided in the water supply connections to one or both of the primary ports of the variable flow fluid impedance devices. Non-return check valves are preferably provided in the fuel supply connection to the secondary port of the first, and in the water supply connection to the emulsifier from the outlet port of the second, variable flow fluid impedance devices. A closure valve, e.g. solenoid operated, may be provided in the water supply connection to the emulsifier; this may be employed in conjunction with a closure valve on the fuel supply connection to the fluid control circuit for isolating the water supply from the emulsifier which will then be able to supply fuel, admixed with water, to a diesel engine, gas turbine, boiler furnace or petrol engine to which it is connected.

Restrictor adjustment enables matching of the circuit to an emulsifier and superimposition of the characteristics of the variable flow fluid impedance devices, the output from the first of which may be arranged to decrease with increased fuel supply pressure while the output from the second, which may be arranged to increase with decreased pressure at its secondary inlet, increases with increased fuel supply pressure. Equally the reverse arrangement can be provided.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
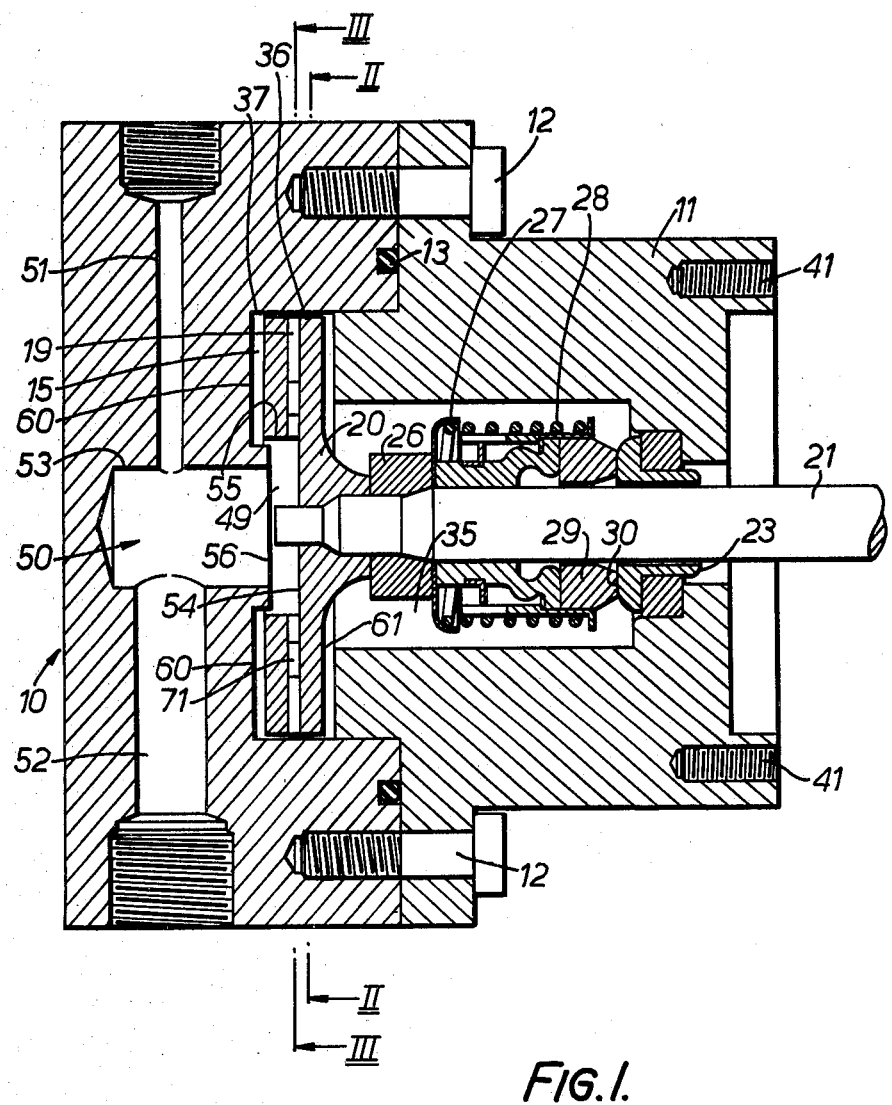
FIG. 1 is a longitudinal cross section of a preferred embodiment of an emulsifier in accordance with the invention.

The emulsifier shown in FIGS. 1 to 4 consists of an inlet chamber housing 10 and a seal housing 11 bolted together by bolts 12 and provided with an 'O' ring seal 13. The housings 10 and 11 between them provide a mixing chamber 15. Located in the mixing chamber for free rotation therein is a rotor 20 having radial passages 19, the rotor being supported on a shouldered drive shaft 21 which extends out through an aperture 23 to an external drive 25 (not shown).

Interposed between the rotor 20 and the aperture 23 is a mechanical seal of conventional type, the aperture 23 being part of the seal. The seal is located within a seal chamber 35 formed in the seal housing 11. The seal chamber 35 is separated from the mixing chamber 15 by the rotor 20 except for a small clearance 36 between the outer edge of the rotor and the inner peripheral wall 37 of the mixing chamber 15. Liquids are prevented from passing directly through into the chamber 35 by the provision of a recirculation flow of the emulsion which is introduced through an orifice (not shown) into the seal housing 11 and which provides a cooling effect for the seal and then recombines with the emulsion in the chamber 15. The housing 10 provides an inlet chamber 50 which is fed by a water inlet passage 51 and a fuel inlet passage 52. The inlet chamber comprises a substantially cylindrical chamber 53 at the confluence of the passages 51 and 52, plus the disc shaped chamber 49 located between the central end face 54 of the rotor 20, the inlet wall 55 of the passages 19 and the end face 56 of the chamber 53, The mixing chamber 15 is defined as being bounded by an inner wall 55, an outer side wall, of which part 37, is circular and part, 66, is spiral, a front wall and a rear wall defined by the rear wall 61 of the rotor. The mixing chamber communicates with an outlet passage 55 disposed tangentially to the rotor (see FIG. 2) and transverse to its axis, though it could be parallel to its axis or at any position between these two.

The circular wall 37 extends around the chamber for 240° and the spiral or helical wall 66 extends outwardly from the point 70 to the outer edge of the outlet passage 65. The mixing chamber includes this part crescent shaped region extending from point 70 to the line 72 across the opening 65. The mixing chamber is largely occupied by the rotor 20.

The ratio of the volume of the inlet chamber 50 to the free volume of the mixing chamber 15, i.e. its volume minus that of the rotor, is preferably in the range 0.8:1 to 1.4:1, e.g. 0.9:1 to 1.3:1, especially about 1.1:1.

The clearance, C, between the wall 37 and the outer space of the rotor is preferably in the range 0.001" to 0.005", e.g. 0.002". The radius, R, of the rotor is 2.8".

The ratio R/C is preferably at least 200:1 or preferably at least 500:1, e.g. in the range 500:1 to 3000:1, and more particular 1000:1 to 2000:1.

Figure 2:
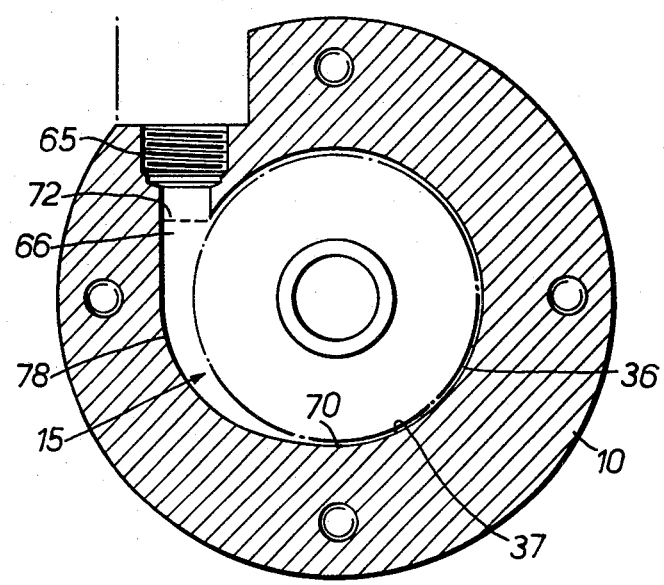
FIG. 2 is a cross section on the line II—II of FIG. 1, on a reduced scale, showing the mixing chamber and, diagrammatically, the outline of the rotor.

The generally crescent shaped region may have a flat outer wall as shown in FIG. 2. However, one convenient way of making this part of the housing is to mill out the cylindrical mixing chamber and drill the circular outlet opening 65 tangentially to the circular chamber down to the point 78. One can then pick out the region of mixing chamber 15 with a milling machine from a line 72 down to the point 70 so as to smooth out the transition between the hole 65 and the circular wall 37 of the mixing chamber to form the curved region extending from the line 72 to the point 70. In this arrangement, the wall 66 need not be flat. The maximum clearance, C2, between the wall 66 and the periphery of the rotor at the point 78 is many times that of the clearance C between the wall 37 and the rotor and the ratio C2/C is preferably at least 10:1 and more desirably at least 50:1 or 100:1 and particularly in the range 50:1 to 200:1 or 500:1.

Figure 3:
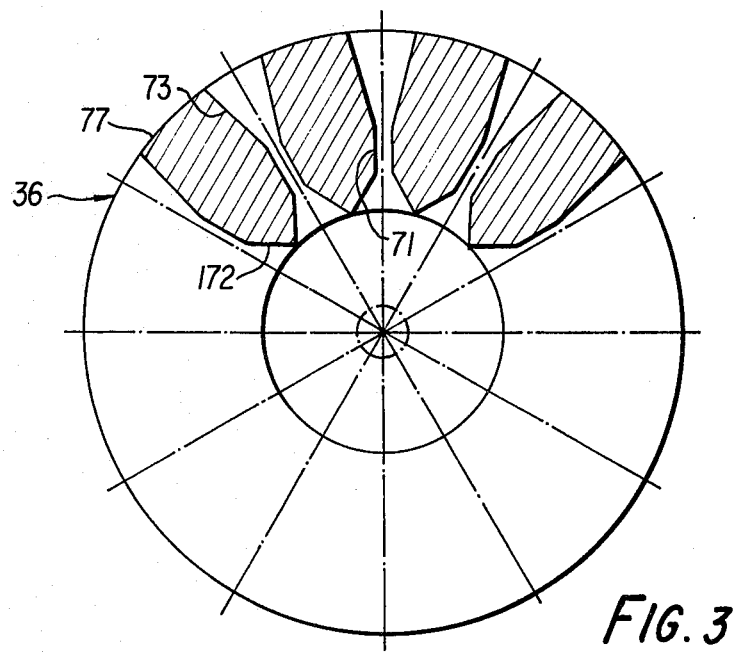
FIG. 3 is a cross section on the line III—III of FIG. 1, on an enlarged scale showing in detail the shape of the passages in the rotor.

Referring now to FIG. 3, the rotor 20 in this embodiment has twelve radial passages 19 equally spaced apart through 30° and extending from the inlet wall 55 to the outer periphery 36 of the rotor 20. The radial length of each passage 19 is 0.6 times the radius of the rotor.

In this form of the invention the inlet end is a V shaped slot 172 including an angle of 60° and the outlet end is a V shaped slot 73 including an angle of 20°: these angles are such that the slots would intersect even if the passage was not broadened in this region to form a parallel sided throat portion 71, 1/12″ wide.

More broadly, the included angle of the slot 172 is greater than that of the slot 73 and can range from 40° to 80° while the included angle of the slot 73 can range from 10° to 40°.

The ratio of the width of the throat 71 to the width of the inlet end can vary from 0.5:1 to 0.1:1 e.g. 0.2:1 to 0.4:1.

The ratio of the length of the radial passage 19 to the radius of the rotor 20 can vary from 0.9:1 to 0.4:1.

The throat or constriction, or if there are multiple throats or constrictions, at least one is desirably located within 10% to 90% e.g. 20% to 80% of the length of the passage 19 from its inlet end.

When the passage is provided with a convergent divergent duct the divergent portion is preferably longer than the convergent portion. However, the inlet diameter or width is preferably much the same as the outlet diameter or width e.g. in the range of ratios of 0.8:1 to 1.2:1.

In operation for example, water can be fed to a boiler feedstock in amounts ranging from 2½% to 15% by weight based on the weight of the mixture. Boilers having thermal capacities from 1,000,000 BTU/hr to 10,000,000 BTU/hr have been successfully supplied with fuel/water mixtures. The supplies of water and fuel are held in tanks about 6 feet above the emulsifier providing a feed pressure of about 3 p.s.i. If a pressurized fuel supply is used then the water supply should be pressurized to a similar pressure. The rotor is driven at 2800 r.p.m. and up to 5000 r.p.m. in a clockwise direction as viewed in FIG. 2. The fuel and water mixture is drawn from the inlet chamber by the centrifugal force on the liquid in the passages 19 and thrown out radially through the passages 19 and caused to hit the wall 37. The outer wall 36 of the rotor is broken up into twelve solid portions 77, each about twice the circumferential length of the outlets 73, and the solid portions 77 may be considered to act as vanes.

They thus have the function both of shearing the fuel and water mixture in the gap between the wall 37 and the wall 36 and propelling it around the circumference of the mixing chamber through the part crescent shaped region 78, where turbulent mixing may be expected to occur and then ejecting it through the outlet passage 65.

In the embodiment of FIG. 3 the constriction 71 has the function of impeding the flow of fluid along the passage 19 and thus increasing its velocity outwardly and the diverging outlet slots then cause a pressure drop in the fluid resulting in vapourization of the fuel in the mixture.

Figure 4:
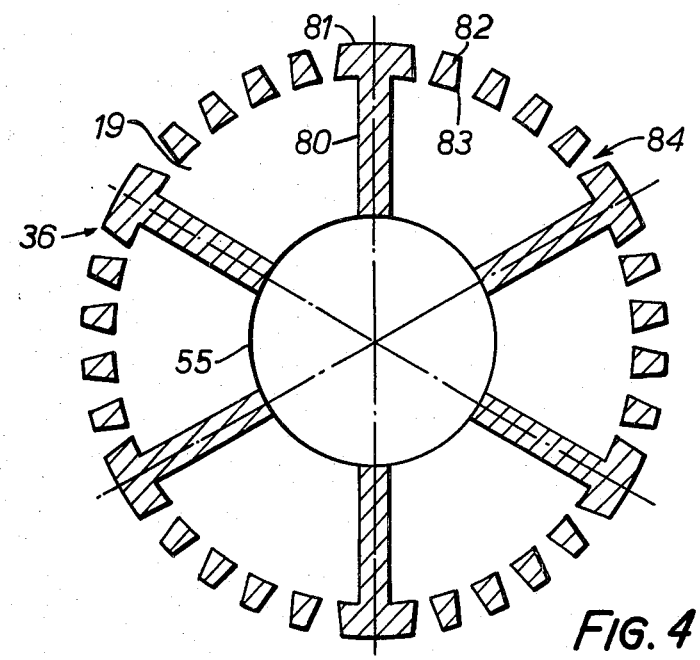
FIG. 4 is a view similar to FIG. 3 showing the modified form of rotor.
Figure 5:
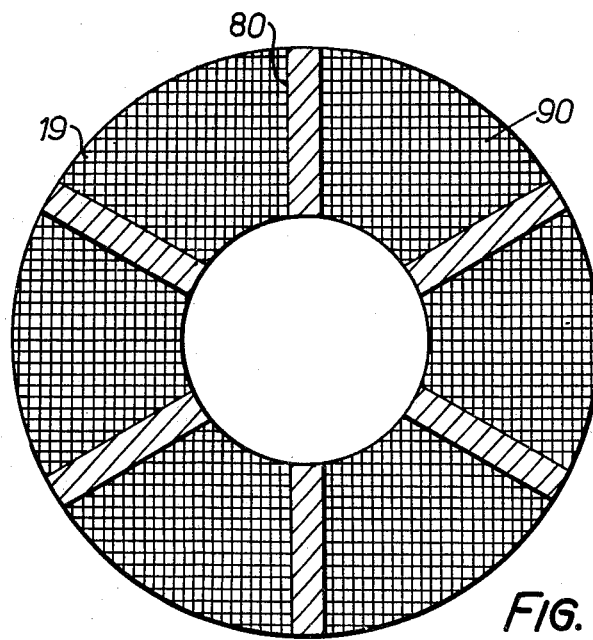
FIG. 5 is a view similar to FIG. 3 showing another modified form of rotor.

FIGS. 4 and 5 show alternative forms of a rotor. That shown in FIG. 4 can be considered to have six passages 19 each separated by relatively thin walls 80.

The outer ends 81 of the thin walls 80 can be considered to have a similar function to the solid vane portions 77 in FIG. 3.

The constrictions in the passage 19 in this embodiment are provided by five equally spaced wedge shaped members 82 disposed adjacent the outer surface 70 of the rotor.

The constrictions in this embodiment are thus point constrictions 83 rather than elongated throats 71 as in the FIG. 3 embodiment.

Short outlet slots 84 including an angle of 30° extend outwardly from each constriction 83.

In the embodiment of FIG. 5, six wedge shaped outlet passages 19 are provided separated by straight radial walls 80. The whole of the volume of each passage 19 is occupied by a wedge 90 of porous material, e.g. sintered metal, suitably keyed therein. This provides an impedance to flow of the fluids along the passage 19 and performs a similar function to the constriction 71 in the FIG. 3 embodiments. It may function as a multiplicity of small constrictions.

An appropriate material is one which results in the emulsion having a water droplet size of 10 to 30 microns.

Figure 6:
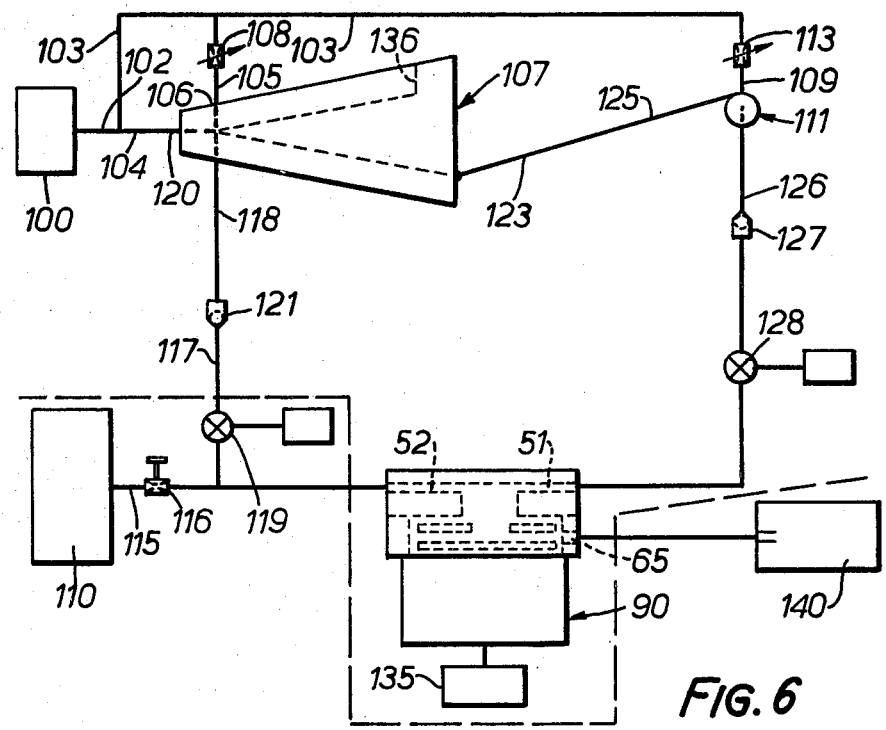
FIG. 6 is a diagrammatic fluid logic control circuit layout showing how the emulsifier may be utilized to supply water/fuel mixtures to an industrial oil fired boiler.
Figure 7:
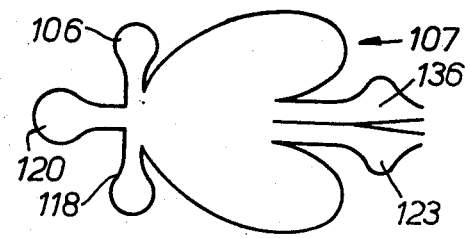
FIG. 7 is a diagrammatic representation of a differential beam deflection amplifier suitable for use in the fluid logic circuit shown in FIG. 6.
Figure 8:
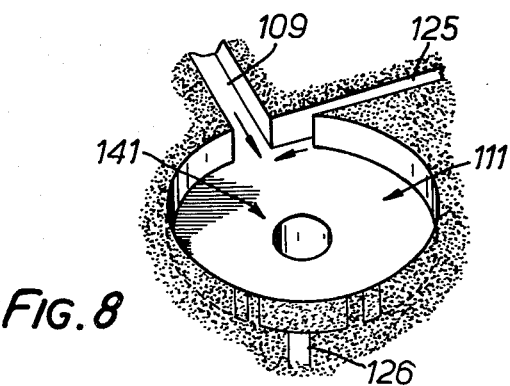
FIG. 8 is a diagrammatic representation of a vortex diode suitable for use in the circuit shown in FIG. 6.

Turning now to FIG. 6 the circuit shown is a fluidic circuit for controlling the emulsifier 90 and is appropriate for use with industrial boilers as described above.

The circuit consists of a water supply tank 100 and a fuel supply tank 110.

The water tank 100 has an output 102 which is split into a supply line 103 and a control line 104. The line 103 has a branch 105 which feeds the left control port 106 of a differential beam deflection amplifier 107, via a variable orifice needle valve 108. The control line 104 is connected to the power chamber 120 of the amplifier 107. The line 103 feeds the power supply port 109 of a vortex diode 111 via a variable orifice needle valve 113.

The fuel tank 110 has an output line 115 controlled by a control valve 116 and has a branch 117 which feeds the right control port 118 of the amplifier 107 via a solenoid controlled valve 119 and a non-return valve 121 which prevents flow from 118 to 119. The fuel output line 115 is connected to the fuel input passage 52 of the emulsifier 90.

The output 123 from the amplifier 107 is connected to the control input 125 of the vortex diode 111. The amplifier 107 is chosen to have an output flow equivalent to the input flow required to control the vortex diode 111 and the two devices are thus matched.

The output 126 of the vortex diode 111 is connected to the water supply passage 51 of the emulsifier 90 via a non-return valve 127 and a solenoid controlled valve 128.

The emulsifier rotor is driven by a, desirably variable speed, motor 135 and the fuel/water mixture issuing from the outlet 65 from the emulsifier is fed to the combustion space 140.

The valves 119 and 128 are controlled by the valve 116 e.g. by a timer so that they only open after neat fuel has been fed to the boiler 140.

The mode of operation of the device is as follows:

The valves 108 and 113 are adjusted and preset to the required settings to give the correct water flow rate to give the desired fuel/water blend. The motor 135 is switched on followed by the valve 116 at the required flow rate. After a 10 second delay during which the neat fuel is ignited, the solenoid valves 119 and 128 open.

The fuel flows up through the valves 119 and 121 and establishes a control pressure at the port 118 which is related to its flow rate through the line 115. The water supply is automatically switched on by the opening of the valve 128, and the flow through the valve 108 engages the flow through the port 118 so that the main water flow through the line 104 is split in the amplifier 107, e.g. equally, between the drain port 136 and the outlet port 123.

The impedance of the port 123 is very much greater than the impedance at the outlet port 126 of the vortex diode 111, thus substantially all of the water flow from 102 goes through the line 103 and the valve 113 and straight through the vortex diode from the radial inlet port 109 to the central outlet port 126.

The ratio of the flow through the port 123 and thus the control port 125 to the flow through the port 109 in the normal flow condition is such that only a small portion of the flow through the inlet port 109 is diverted into a vortex in the chamber 141.

When the pressure in the line 118 increases, i.e. when an increased demand for fuel occurs, the flow from 104 is directed towards the drain 136 the flow through 123 and thus 125 decreases in proportion thereto and thus the vortex in 111 is diminished and the water flow through 126 is correspondingly increased to restore the fuel/water ratio to its set value. The flow through 107 is typically 0.001 times the flow through 111.

When the pressure in 118 decreases the reverse sequence occurs and the flow through 126 decreases.

The arrangement shown in FIG. 6 has the substantial advantage that the amount of oil flow required to generate the control signal is very small relative to the total flow and thus the liquids in the amplifier 107 only form a relatively small volume and can be returned to the water supply tank without an excessive build up of oil occurring even with continuous use.

EXAMPLES 1 to 3

Domestic and industrial boiler fuels typically have viscosities of about 35 to 3000 e.g. 1000 Redwood seconds. One series of tests was carried out on a domestic boiler using diesel oil having a calorific value of 18500 Btu/lb. and a viscosity of 35 Redwood seconds.

The emulsifier shown in FIGS. 1 to 3 was used but the control circuit of FIG. 6 was not used.

The boiler had an output of 1,500,000 Btu/hr and a working pressure of 8 p.s.i. and it used a pressurised jet burner unit. Fuel was accurately metered under gravity to the emulsifier which was located in the feed line just before the burner gear pump which supplies fuel at ambient temperature and 160 p.s.i. to the burner nozzle. The load on the boiler was the supply of domestic heating water, the temperature of which was thermostatically controlled. The water was accurately metered via a non return valve and a solenoid controlled valve to the emulsifier.

The boiler was started up on pure fuel, then, after ignition, the rotor was started and the solenoid water control valve was opened. When the boiler is to switch off, the solenoid valve is closed and after a timed interval, the oil pump switches off. This ensures that the boiler fuel supply will be pure fuel for the next ignition.

Table 1 below shows three examples of different operating conditions and results.

TABLE 1

| Example | 1 | 2 | 3 |
|---|---|---|---|
| Fuel composition | | | |
| Fuel/water (%) | 100/0 | 94.6/5.4 | 86.6/13.4 |
| Exhaust temp. (°F.) | 740 | 700 | 660 |
| Exhaust gas analysis | | | |
| $CO_2$ content % | 8.5 | 10 | 11 |
| Bacharach | | | |
| Smoke scale | 3 | 3 | 3 |
| Oil flow (galls/min) | 0.182 | 0.174 | 0.16 |
| Water flow (galls/min) | 0 | 0.01 | 0.024 |
| Combustion efficiency (%) | 70.5 | 74.8 | 77.5 |

Further tests on the same boiler using a total fuel/water flow in the range 1.41 to 14.4 gallons per hour indicated that one could reduce the Bacharach smoke number (BSN) from 9 with zero water to 0 with 9% water; 2.5% $H_2O$ giving a BSN of 8; 3.2% $H_2O$, 7; 4.25% $H_2O$, 6; 5.9% $H_2O$, 4; 6.35% $H_2O$, 3; 7.7% $H_2O$, 2; and 8.4% $H_2O$, 1.

Tests have also been carried out on 50 horsepower Perkins diesel engines again using the emulsifier of FIGS. 1 to 3. These tests indicate that over the 4 to 24 b.h.p. range at an engine speed of 1000 r.p.m., a 5% water/fuel mixture produced by the emulsifier resulted in a saving of about 5–10% of fuel, and a 10% water/fuel mixture resulted in a saving of about 10–20%.

The noise levels and smoke levels were also significantly reduced.

Savings in fuel consumption also occurred at engine speeds of 1500 r.p.m. and smaller savings at 2000 r.p.m.

The fuel used was standard industrial diesel fuel having a viscosity of 30–33 Redwood seconds. We found that the optimum mixtures were 1 to 10% water. Optimum mixtures were 1–10% water.

The rotor shown in FIG. 3 is best used for fuels having viscosities from 35 Redwood seconds up to 3000 Redwood seconds and rotor speeds of 2800 to 7000 r.p.m. The rotor is thought to work by vaporization of the fuel as it goes through the throat of the passages 19 producing cavitation in the fuel/water mixture, the water droplets are thought to be sheared by the wall 37 and the vanes 77 and the fuel is thought to condense on the surface of the water droplets in the turbulent flow region 78.

The rotor shown in FIG. 4 is best used for higher viscosity materials such as Bunker C fuel which has a viscosity of the order of 3500 Redwood seconds. We have found that satisfactory emulsions with water can be made using this rotor at rotor speeds of 1400 to 7000 r.p.m. and here it is thought that the process involved is largely shearing. We have found that we can mix 5% to 20% of water with such high viscosity materials and produce emulsions stable for in excess of 10 days.

The rotor shown in FIG. 5 is best used for very volatile low viscosity fuels such as Kerosene and petrol which have viscosities of less than 35 Redwood seconds.

The sintered material used in FIG. 5 can be considered to provide a multiplicity of labyrinthine passages extending from the interior of the rotor outwardly to its exterior circumferential surface. Each passage contains a multiplicity of constrictions or impediments to flow. These are thought to cause vapourization of the fuel and water and shear of the fuel and water within the rotor.

Further shear is thought to occur through boundary layer attachment between the stationary wall 37 of the mixing chamber and the rapidly moving surface of the rotor.

The ratio of the closed or solid area, F, of the periphery of the rotor to the open area, O, provided by the outlet of the passages through the rotor is greater than 1:1 and preferably greater than 3:1, e.g. in the range 5:1 to 15:1, especially 5:1 to 10:1 for the rotors of FIGS. 3, 4 and 5 where the values are 7:1, 6:1 and 9:1 respectively.

In a further form of rotor, a solid rotor ¾" long and ¾" in diameter is used provided with 1/16" diameter holes drilled radially through the rotor and positioned at 22½° pitch so that the rotor has 16 such radial passages. These passages afford a constriction in the fluid flow between the input to the emulsifier and its output.

Here the ratio S/O is about 4.5:1, e.g. in the range 3:1 to 10:1 or 3:1 to 6:1. This rotor was used with diesel fuel having a Redwood viscosity of 30 to 35 seconds at 7000 r.p.m. and produced good results.

EXAMPLE 5

We have utilized the emulsifier shown in FIGS. 1, 2 and 5 in a petrol driven generator to light a load of 1500 watts of bulbs. The fuel was 97 octane petrol having a viscosity of not more than 20 Redwood seconds.

The generator had a bowl and float carburettor. The emulsifier was welded into the side wall of the bowl. The fuel and water were lead into the emulsifier from the outside and the blend fed into the bowl of the carburetor below the float. The engine worked very satisfactorily and smoothly with reduced fumes and noise.

A control circuit like that shown in FIG. 6 could be used in petrol engines where there is a varying load.

The emulsifier could also be used with mixtures of solids and liquids provided the solids were of sufficiently small particle size to prevent blocking of the passages 19 and the clearance between the rotor and the wall 37.

The device has been found to produce little or no pressure rise, e.g. not more than 1 p.s.i. using feed pressures of 5–30 p.s.i. Obviously numerous modifications and variations of the present invention are possible in light of the above teachings. It is therefore to be understood that within the scope of the appended claims, the invention may be practiced otherwise than as specifically described herein.

What is claimed as new and desired to be secured by letters Patent of the United States is:

1. Apparatus for mixing fluids comprising a housing affording a substantially annular mixing chamber, an annular rotor mounted for rotation in the mixing chamber, the rotor having one or more inlet orifices disposed at or adjacent its axis of rotation, an inlet chamber communicating with the inlet orifices in the rotor and disposed at or adjacent the axis of rotation of the rotor, the inlet chamber being provided with inlet means for the fluids to be mixed, outwardly extending passages being located in the rotor, and leading from the said inlet orifices to the periphery of the rotor and emerging therethrough, each passage diverging from an inlet to a constriction region in which a multiplicity of constrictions are located and each passage issuing out as a diverging passage through an annular wall at the periphery of the rotor, the mixing chamber having a circular outer wall extending around a major proportion of its circumference with a small clearance between the said circular wall and the periphery of the rotor, the circular outer wall extending outwardly into a spiral shape so as to define a generally crescent shaped outlet region between the spiral shaped wall of the mixing chamber and the periphery of the rotor, the outlet region communicating with an outlet passage and drive means arranged to enable the rotor to be rotated in the mixing chamber.

2. Apparatus for mixing fluids comprising a housing affording a substantially annular mixing chamber, an annular rotor mounted for rotation in the mixing chamber, the rotor having one or more inlet orifices disposed at or adjacent its axis of rotation, an inlet chamber communicating with the inlet orifices in the rotor and disposed at or adjacent the axis of rotation of the rotor, the inlet chamber being provided with inlet means for the fluid to be mixed, outwardly extending passages being located in the rotor, and leading from the said inlet orifices to the periphery of the rotor and emerging therethrough, each passage diverging from an inlet to a constriction region in which a multiplicity of constrictions are located and each passage issuing out as a diverging passage through an annular wall at the periphery of the rotor, the mixing chamber having a circular outer wall extending around a major proportion of its circumference with a small clearance between the said circular wall and the periphery of the rotor, the ratio of the radius of the rotor to the clearance between the periphery of the rotor and the circular portion of the outer wall of the mixing chamber being at least 200:1, the circular outer wall extending outwardly into a spiral shape so as to define a generally crescent shaped outlet region between the spiral shaped wall of the mixing chamber and the periphery of the rotor, the outlet region communicating with an outlet passage and drive means arranged to enable the rotor to be rotated in the mixing chamber.

3. Apparatus for mixing fluids comprising a housing affording a substantially annular mixing chamber, an annular rotor mounted for rotation in the mixing chamber, the rotor having one or more inlet orifices disposed at or adjacent its axis of rotation, an inlet chamber communicating with the inlet orifices in the rotor and disposed at or adjacent the axis of rotation of the rotor, the inlet chamber being provided with inlet means for the fluids to be mixed, 4 to 20 outwardly extending passages being located in the rotor, and leading from the said inlet orifices to the periphery of the rotor and emerging therethrough, each passage diverging from an inlet to a constriction region in which a multiplicity of constrictions are located and each passage issuing out as a diverging passage through an annular wall at the periphery of the rotor, the mixing chamber having a circular outer wall extending around a major proportion of its circumference with a small clearance between the said circular wall and the periphery of the rotor, the ratio of the radius of the rotor to the clearance between the periphery of the rotor and the circular portion of the outer wall of the mixing chamber being at least 200:1, the circular outer wall extending outwardly into a spiral shape so as to define a generally crescent shaped outlet region between the spiral shaped wall of the mixing chamber and the periphery of the rotor, the outlet region communicating with an outlet passage and drive means arranged to enable the rotor to be rotated in the mixing chamber.

* * * * *